(12) United States Patent
Hsiau et al.

(10) Patent No.: US 8,491,711 B2
(45) Date of Patent: Jul. 23, 2013

(54) MOVING GRANULAR BED WITH GAS GUIDING SYSTEM

(75) Inventors: Shu-San Hsiau, Taipei (TW); Yau-Pin Chyou, Taipei (TW); Chia-Jen Hsu, Yunlin County (TW); Yi-Shun Chen, Taipei (TW); Po-Chuang Chen, Taoyuan County (TW)

(73) Assignee: Institute of Nuclear Energy Research, Atomic Energy Council, Executive Yuan, Taoyuan County (TW)

( * ) Notice: Subject to any disclaimer, the term of this patent is extended or adjusted under 35 U.S.C. 154(b) by 350 days.

(21) Appl. No.: 12/909,426

(22) Filed: Oct. 21, 2010

(65) Prior Publication Data

US 2011/0277640 A1 Nov. 17, 2011

(30) Foreign Application Priority Data

May 11, 2010 (TW) ................................. 99114971 A

(51) Int. Cl.
*B01D 53/06* (2006.01)
(52) U.S. Cl.
USPC .................. 96/150; 96/399; 96/400; 96/401; 96/417; 55/474; 55/512; 55/515
(58) Field of Classification Search
USPC ............ 96/399, 400, 401, 417, 150; 422/108, 422/109, 110, 111; 55/474, 512–515
See application file for complete search history.

(56) References Cited

U.S. PATENT DOCUMENTS 3,983,849 A * 10/1976 Stumpp .......................... 123/275
2007/0003450 A1 * 1/2007 Burdett et al. ................. 422/108

* cited by examiner

*Primary Examiner* — Robert Clemente
*Assistant Examiner* — Karla Hawkins
(74) *Attorney, Agent, or Firm* — Muncy, Geissler, Olds & Lowe, PLLC

(57) ABSTRACT

A moving granular bed includes a filter granule channel, an inlet unit of gas, an outlet unit of gas, a first detecting unit and a feedback control unit. The inlet unit of gas is disposed at one side of the filter granule channel, and the dirty gas is fed into the filter granule channel through the inlet unit of gas. The inlet unit of gas has a first flow-guiding plate. The outlet unit of gas is disposed at the other side of the filter granule channel. The first detecting unit detects the gas velocity at the inlet unit of gas site. The feedback control unit is electrically connected with the first detecting unit, and controls the angle of the first flow-guiding plate and flow rate of filter granules according to a detecting result of the first detecting unit. A gas guiding system used in the moving granular bed is also disclosed. The moving granular bed and gas guiding system can make the dirty gas have different velocity or distribution while passing through the filter granule channel so as to improve the usage of the filter granules.

12 Claims, 5 Drawing Sheets

MOVING GRANULAR BED WITH GAS GUIDING SYSTEM

CROSS REFERENCE TO RELATED APPLICATIONS

This Non-provisional application claims priority under 35 U.S.C. §119(a) on Patent Application No(s). 099114971 filed in Taiwan, Republic of China on May 11, 2010, the entire contents of which are hereby incorporated by reference.

BACKGROUND OF THE INVENTION

1. Field of Invention

The present invention relates to a moving granular bed.

2. Related Art

The industrial contaminants such as particulates, acid gas (e.g. HCL, $SO_2$, $NO_x$), and organics commonly cause the air pollution, so that these contaminants must be processed before they are discharged. If not, the contaminants can generate a huge impact to our environment. In order to remove the contaminants, the granular bed filter was disclosed many years ago for simultaneously remove dust particulates contaminant and $SO_2$ contaminant at high temperature (>400° C.). In general, the granular bed is divided into four kinds of reactors: (1) a fixed bed, (2) an intermittent moving bed, (3) a continuous moving bed, and (4) a moving granular bed. The moving granular bed is also called a fluidized bed, which is widely applied to various kinds of industries. Since the moving granular bed has the physical and chemical applications and can remove different kinds of contaminants, it has an excellent potential for cleaning the complex smokestacks gas generated by the incinerating process.

FIG. 1 is a schematic diagram showing a conventional moving granular bed 1, which includes a filter granule channel 11, an inlet unit of gas 12, and an outlet unit of gas 13. The filter granules 111 is filled into the filter granule channel 11 through a inlet of filter granules 112 in a slow moving way, and is left the filter granule channel 11 through an outlet of filter granules 113. The dirty gas enters through the inlet unit 12 to arrive one side of the filter granule channel 11. Accordingly, the dust particulates and contaminants contained in the dirty gas can be collected by the filter granules 111 and then took away by the filter granules 111, which moves from the top to the bottom slowly and finally out of the filter granule channel 11 through the outlet of filter granules 113. At the meantime, the filtered clean gas can flow to the outlet unit 13 disposed at the other side of the filter granule channel 11, and then be exhausted through the outlet unit 13.

In the moving granular bed 1, however, when the dirty gas enters through the pipes of the inlet unit 12, its velocity distribution usually has a single peak, which means that the gas velocity at the center of the pipe of the inlet unit 12 is higher than that near the wall of pipe due to the wall effect. Because the gas velocity can not be efficiently distributed and controlled, the collection efficiency of the filter granules 111 for filtering the dust particulates can not be optimized. Moreover, some filter granules 111 may pass through the entire filter granule channel 11 without collection anything, which sufficiently decreases the usage of the filter granules.

Therefore, it is an important subject of the invention to provide a moving granular bed that can input the dirty gas into the filter granule channel with uniform velocity distribution so as to improve the usage of the filter granules.

SUMMARY OF THE INVENTION

In view of the foregoing subject, an objective of the present invention is to provide a moving granular bed and a gas guiding system thereof that can make the dirty gas have different velocity or distribution while passing through the filter granule channel so as to improve the usage of the filter granules.

To achieve the above objective, the present invention discloses a moving granular bed, which includes a filter granule channel, an inlet unit of gas, an outlet unit of gas, a first detecting unit, and a feedback control unit. The inlet unit of gas is disposed at inlet side of the gas and has a first flow-guiding plate. The dirty gas is fed into the filter granule channel through the inlet unit of gas. The outlet unit of gas is disposed at the outlet side of gas. The first detecting unit detects a gas velocity at the inlet unit of gas. The feedback control unit is electrically connected with the first detecting unit and controls the angle of the first flow-guiding plate according to a detecting result of the first detecting unit.

To achieve the above objective, the present invention also discloses a gas guiding system, which is at least partially disposed between a filter granule channel and an inlet unit of gas. The dirty gas is fed into the filter granule channel through the inlet unit of gas. The gas guiding system includes a first flow-guiding plate, a first detecting unit, and a feedback control unit. The first flow-guiding plate is disposed between the filter granule channel and the inlet unit of gas. The first detecting unit detects a gas velocity of the dirty gas. The feedback control unit is electrically connected with the first detecting unit and controls the angle of the first flow-guiding plate according to a detecting result of the first detecting unit.

In one embodiment, the moving granular bed further includes a second flow-guiding plate and a third flow-guiding plate, which are disposed in the inlet unit of gas. Herein, the angles of the second and third flow-guiding plates are respectively between 10° and 50°.

In one embodiment, the gas guiding system further includes a second flow-guiding plate and a third flow-guiding plate, which are disposed between the filter granule channel and the gas inlet. Herein, the angles of the second and third flow-guiding plates are respectively between 10° and 50°.

In one embodiment, the angle of the first flow-guiding plate is between 0° and 50°.

In one embodiment, the lengths of the first, second and third flow-guiding plates are respectively between 0.2 and 0.7 times of a geometric length of the inlet unit of gas. Besides, the configured number of flow-guiding plates is about 0.002 to 0.01 times of the maximum height (unit: millimeter) of the inlet unit of gas. Herein, the product of the coefficient 0.002 to 0.01 and the maximum height is rounded off to obtain a positive integral, which is considered as the configured number of the flow-guiding plates.

In one embodiment, the feedback control unit controls the angles of the second and third flow-guiding plates according to the detecting result of the first detecting unit.

In one embodiment, the moving granular bed further includes a second detecting unit for detecting a gas velocity at the outlet unit of gas.

In one embodiment, the gas guiding system further includes a second detecting unit disposed between an outlet unit of gas and the filter granule channel.

In one embodiment, the feedback control unit controls the angle of the first flow-guiding plate according to the detecting results of the first and second detecting units.

As mentioned above, the moving granular bed and the gas guiding system thereof of the invention are configured with at least one flow-guiding plate, the angle of which is adjustable. Thus, the airflow volume and gas velocity distribution of the dirty gas while entering the inlet unit of gas into the filter granule channel can be adjusted to improve the usage of the filter granules. In addition, the first detecting unit can detect the airflow volume and gas velocity distribution at the inlet unit of gas, so that the airflow volume and gas velocity distribution of the dirty gas can be retrieved in real time. This configuration can determine that whether the dirty gas enters the filter granule channel as the desired conditions. In the invention, the feedback control unit is connected with the first detecting unit and the flow-guiding plate, so that it can control the angle of the flow-guiding plate according to the detecting result of the first detecting unit, thereby exactly controlling the airflow volume and gas velocity distribution of the dirty gas while entering the inlet unit of gas into the filter granule channel. This can further maintain the efficiency and stability while filtering the gas.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
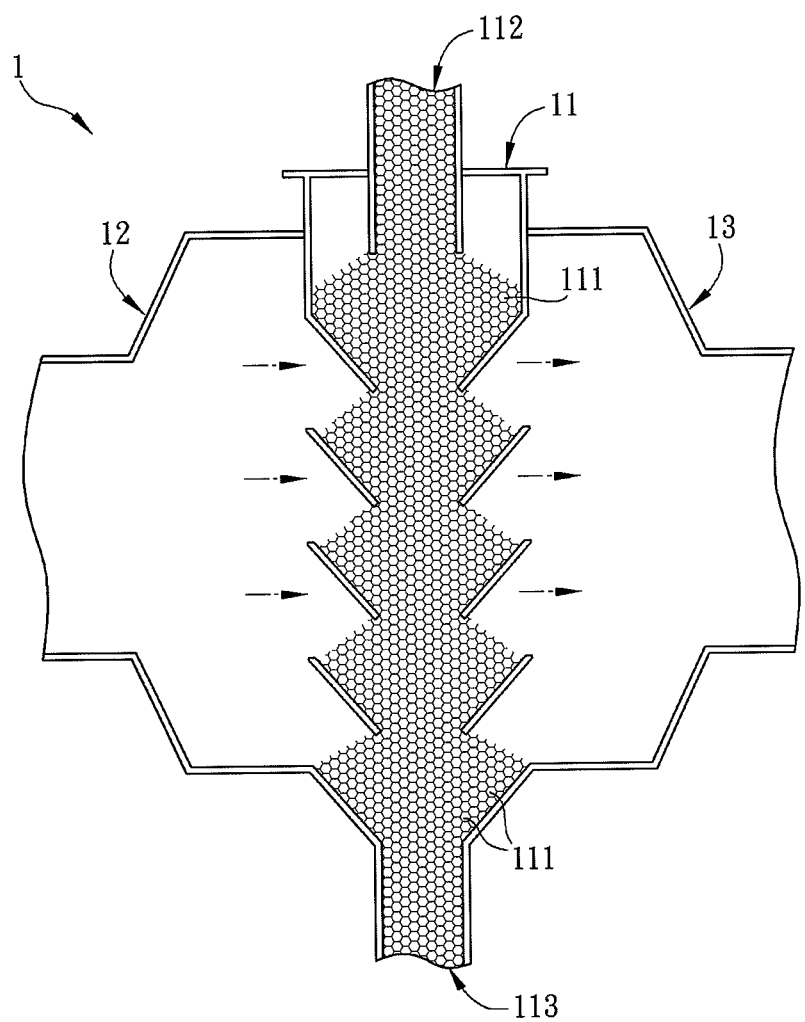
FIG. 1 is a cross-sectional view of a conventional moving granular bed.
Figure 2:
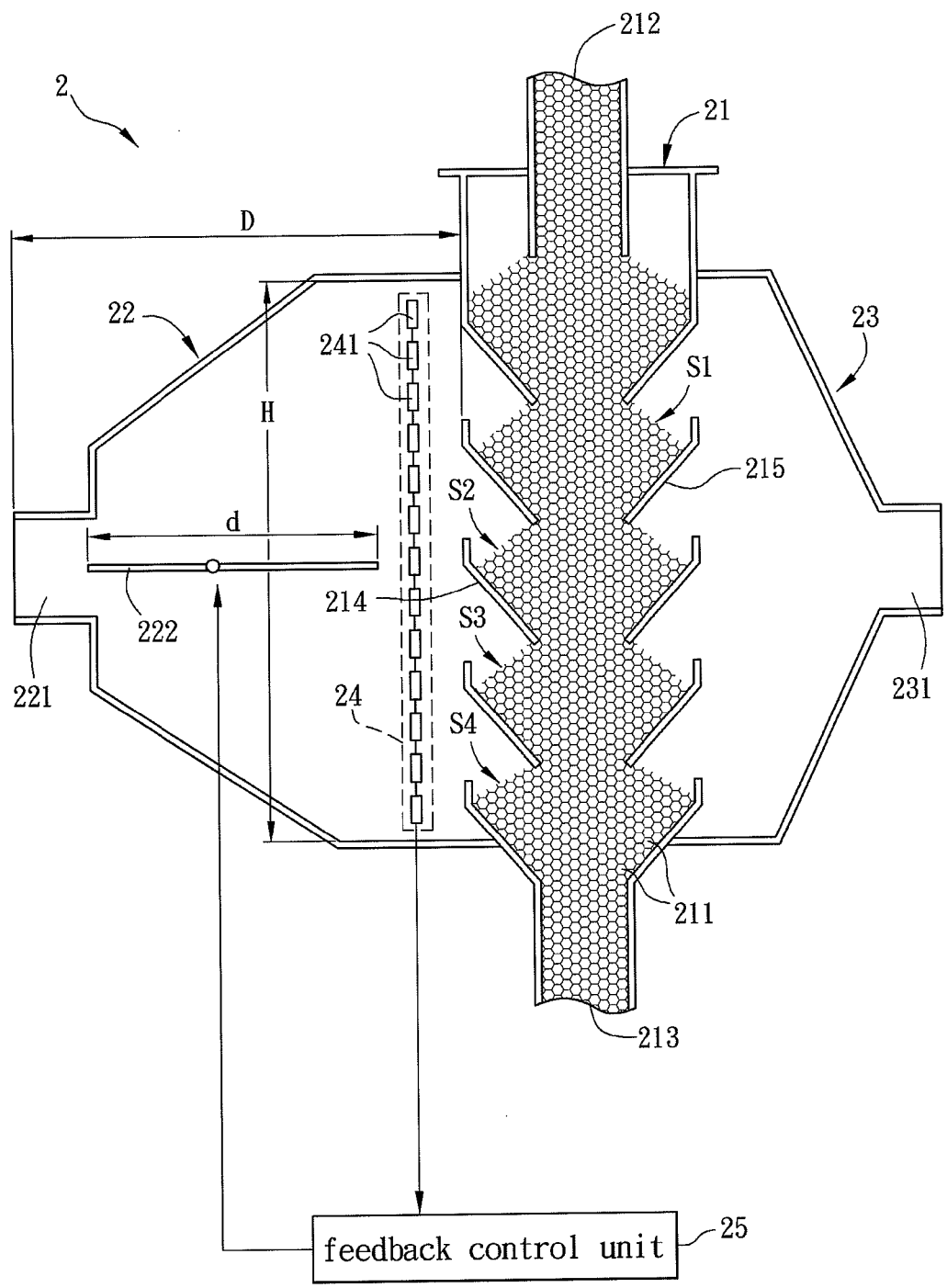
FIG. 2 is a cross-sectional view of a moving granular bed according to a preferred embodiment of the invention.

FIG. 2 is a schematic diagram showing a moving granular bed according to a preferred embodiment of the invention. With reference to FIG. 2, a moving granular bed 2 includes a filter granule channel 21, an inlet unit of gas 22, an outlet unit of gas 23, a first detecting unit 24 and a feedback control unit 25. In the embodiment, the moving granular bed 2 can be used to remove contaminants such as fly ashes and dust particulates in the gas, $H_2S$, $SO_X$, $NO_X$, HCl, alkali, or ammonia. In addition, the moving granular bed 2 can be used to recycle the small particles in the gas.

The filter granule channel 21 is filled with filter granules 211, and it can define the flowing or moving path of the filter granules 211. To be noted, the filter granules filled in the filter granule channel 21 can be various depending on the dirty gas. In this embodiment, the selected filter granules 211 is silica sand, which has an average particle size of 2-4 mm and contains 95% of $SiO_2$ and 5% of other compounds. The filter granule channel 21 has an inlet of filter granules 212, an outlet of filter granules 213, a plurality of input louvers 214, and a plurality of output louvers 215. The clean filter granules 211 is filled into the filter granule channel 21 through the inlet of filter granules 212, and the flow rate of the filter granules 211 can be adjusted according to the gas velocity at the inlet unit of gas 22 and the dust concentration. In detailed, if the dust concentration and/or the gas velocity at the inlet unit of gas 22 increases, the flow rate of the filter granules 211 can be adjusted and increased, so that the dust loading of the filter granules 211 can not be over. On the contrary, if the dust concentration and/or the gas velocity at the inlet unit 22 decreases, the flow rate of the filter granules 211 can be adjusted and decreased so as to avoid the situation that the filter granules 211 may leave the filter granule channel 21 through the outlet of filter granules 213 without collection any or small amount of dust particulates. The outlet of filter granules 213 can output the filter granules 211, which collects the dust particulates, so that the collection and recycling of the used filter granules 211 can be performed easily.

The input louvers 214 are disposed at one side of the filter granule channel 21, and the output louvers 215 are disposed at the other side of the filter granule channel 21. That is the input louvers 214 are located opposite to the output louvers 215. The input louvers 214 and the output louvers 215 are respectively configured similar to the structure of window shutters. In addition, one input louver 214 and one corresponding output louver 215 can form a shape similar to a funnel. Based on this configuration, the filter granules 211 can be controlled to move smoothly in the filter granule channel 21, thereby achieving an efficient filter means.

The inlet unit 22 is disposed at one side of the filter granule channel 21 as the input louvers 214. In the embodiment, the inlet unit 22 has an inlet of gas 221 and a first flow-guiding plate 222, which is disposed corresponding to the inlet of gas 221 and is located between the inlet of gas 221 and the filter granule channel 21. The dirty gas enters the inlet unit of gas 22 through the inlet of gas 221. At the meantime, the angle of the first flow-guiding plate 222 can be adjusted to make the distribution of the dirty gas, which is inputted into the filter granule channel 21, more uniform, so that the collection efficiency of dust particulates can be improved. In this embodiment, the width of the inlet of gas 221 is about 110 mm, the angle of the first flow-guiding plate is between 0° and 50°, and the length of the first flow-guiding plate is between 0.2 and 0.7 times of a geometric length of the inlet unit 22 (e.g. the distance from the inlet of gas 221 to the edge of the input louvers 214). For example, the angle of the first flow-guiding plate 222 of this embodiment is 0°, and the length of the first flow-guiding plate 222 is 230 mm. To be noted, regarding to the definition of the angle, the major moving direction of the filter granules 211 in the filter granule channel 21 may be defined as an angle of 90°; otherwise, the major gas-input direction of the inlet of gas 221 may be defined as an angle of 0°. To be noted, the angle can be defined between a horizontal line and the flow-guiding plate in clockwise or counterclockwise.

The outlet unit 23 is disposed at the other side of the filter granule channel 21 as the output louvers 215. In the embodiment, the outlet unit 23 has an outlet of gas 231, and it can discharge the clean gas after passing through the filter granule channel 21.

The first detecting unit 24 has a plurality of first detectors 241 for detecting the gas velocity at the inlet unit 22. In other words, the first detecting unit 24 is used to detect the velocity and volume distribution of the dirty gas when flowing between the inlet unit 22 and the filter granule channel 21. In the embodiment, the first detectors 241 are configured between the inlet unit 22 and the filter granule channel 21, and the gas velocities and quantities detected by the first detectors 241 are transmitted to the feedback control unit 25 for determining whether the dirty gas is uniformly flowing into the filter granule channel 21 or not. The positions and amount of the first detectors 241 as well as the density thereof can be various due to different designs. In this embodiment, the first detectors 241 are arranged linearly for example.

The feedback control unit 25 and the first detecting unit 24 are electrically connected with each other. According to the detecting result of the first detecting unit 24, the feedback control unit 25 can adjust and control the angle of the first flow-guiding plate 222 by manual or electrical method. To adjust the angle of the first flow-guiding plate 222 allows the dirty gas having a more uniform distribution when flowing through the filter granule channel 21 so as to improve the usage of the filter granules. Alternatively, to adjust the angle of the first flow-guiding plate 222, it is also possible to make the first flow-guiding plate 222 to swing periodically, thereby dynamically adjusting the volume and velocity of the dirty gas while entering into the filter granule channel 21.

Because the first detecting unit 24 can perform the detection function in real time, it can not only detect the volume and velocity but also perform the simple concentration analysis for the dust particulates. Thus, the feedback control unit 25 can dynamically adjust the angle of the first flow-guiding plate 222 according to the detecting result of the first detecting unit 24 so as to further improve the usage of the filter granules 211.

To be noted, to adjust the angle of the first flow-guiding plate 222 can not only make the dirty gas reach a uniform distribution, but also specifically allow the dirty gas to be distributed in a predetermined condition. As shown in FIG. 2, for example, one part of the filter granules 211 near the third and fourth filter surfaces S3 and S4 collects more dust particulates than another part of the filter granules 211 near the first and second filter surfaces S1 and S2. In this case, the first and second filter surfaces S1 and S2 indicate the filter surfaces located in the top-half of the filter granule channel 21, and the third and fourth filter surfaces S3 and S4 indicate the filter surfaces located in the bottom-half of the filter granule channel 21. As shown in FIG. 2, the first filter surface S1, the second filter surface S2, the third filter surface S3 and the fourth filter surface S4 are arranged in order from the inlet of filter granules 212 to the outlet of filter granules 213. In this case, the angle of the first flow-guiding plate 222 can be properly adjusted to make the volume and velocity passing through the first and second filter surfaces S1 and S2 to be larger than those passing through the third and fourth filter surfaces S3 and S4. Accordingly, the usage of the filter granules 211 can be increased so as to prevent the situation that some of the filter granules 211 which is clean or still has good collection ability may be discharged out of the filter granule channel 21.

Figure 3:
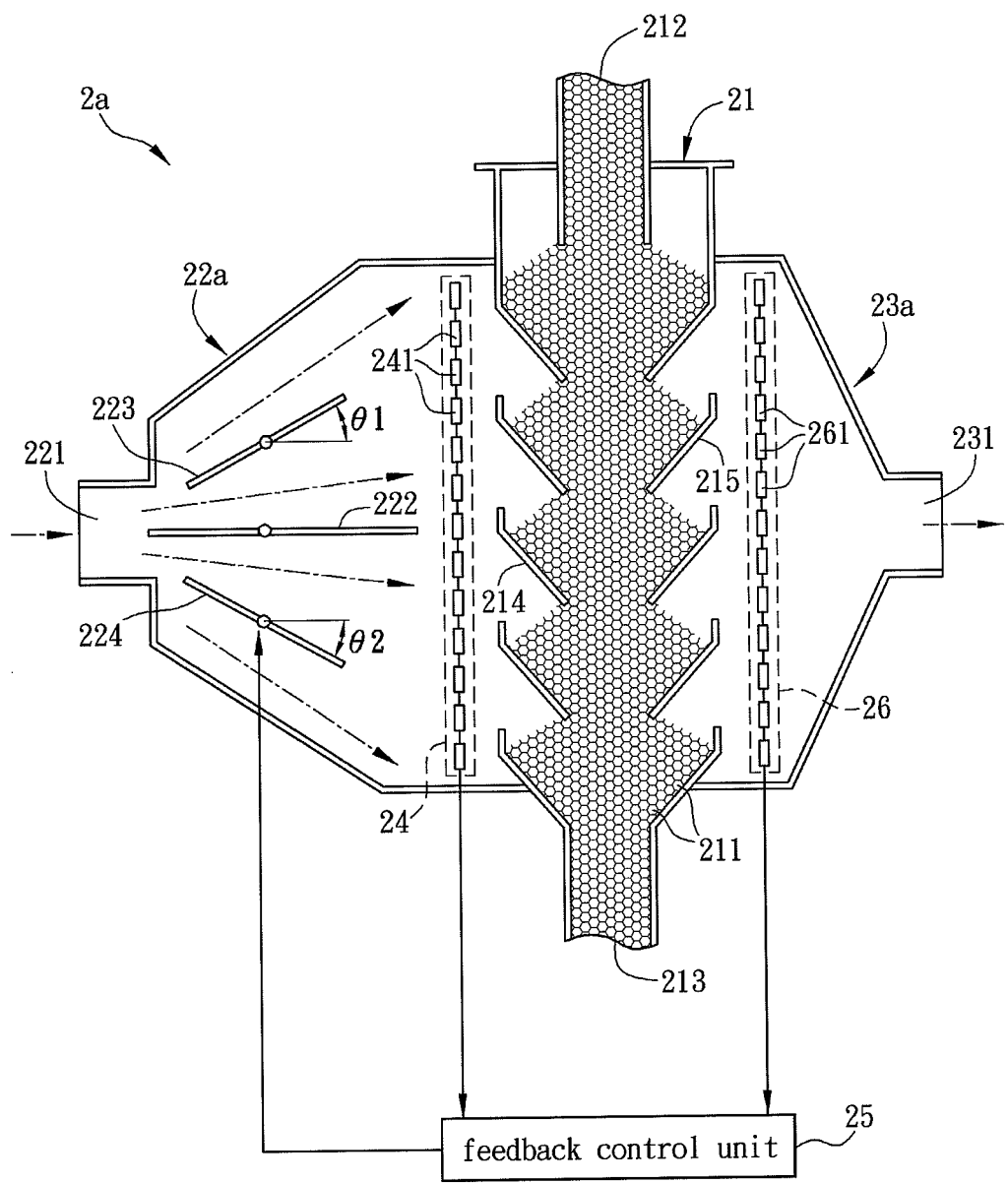
FIG. 3 is a cross-sectional view of another moving granular bed according to the embodiment of the invention.

FIG. 3 is a schematic diagram showing another moving granular bed according to the embodiment of the invention. As shown in FIG. 3, the inlet unit 22a further includes a second flow-guiding plate 223 and a third flow-guiding plate 224, which are disposed corresponding to the inlet of gas 221 and are located between the inlet of gas 221 and the filter granule channel 21. The positions of the first flow-guiding plate 222, the second flow-guiding plate 223 and the third flow-guiding plate 224 may be various depending on the different designs. In this embodiment, the second flow-guiding plate 223 and the third flow-guiding plate 224 are disposed at two sides of the first flow-guiding plate 222 respectively, for example. The configured number of the first, second and third flow-guiding plates 222, 223 and 224 is about 0.0021 to 0.01 times of the maximum height H of the inlet unit 22. Herein, the direction of the height is defined as the major flowing direction of the filter granules 211, and the height unit is millimeter. In addition, the angles θ1 and θ2 of the second flow-guiding plate 223 and the third flow-guiding plate 224 are respectively between 10° and 50°, and the lengths of the second flow-guiding plate 223 and the third flow-guiding plate 224 are respectively between 0.2 and 0.7 times of a geometric length of the inlet unit of gas. To be noted, the angles of the first flow-guiding plate 222, the second flow-guiding plate 223 and the third flow-guiding plate 224 may have different angles and lengths depending on the conditions of different positions or gas volume. For example, the angles θ1 and θ2 of the second flow-guiding plate 223 and the third flow-guiding plate 224 are 30°, and the lengths thereof are 170 mm. In addition, the first flow-guiding plate 222, the second flow-guiding plate 223 and/or the third flow-guiding plate 224 may be made of anti-electrostatic materials so as to prevent the electrostatic effect as contacting with the dust particulates.

Moreover, the moving granular bed 2a of the embodiment may further include a second detecting unit 26, which is disposed opposite to the first detecting unit 24 and has a plurality of second detectors 261 for detecting the gas velocity and volume distribution at the outlet unit 23. In other words, the second detecting unit 26 is used to detect the velocity and volume distribution of the clean gas when flowing between the filter granule channel 21 and the outlet unit 23. In the embodiment, the second detectors 261 are configured between the outlet unit 23 and the filter granule channel 21, and the gas velocities and volumes detected by the second detectors 261 are transmitted to the feedback control unit 25 for determining whether the clean gas is uniformly distributed or flowing out of the filter granule channel 21 based on the preset conditions. The positions and amount of the second detectors 261 as well as the density thereof can be various due to different designs. In addition, the second detecting unit 26 may further detect the clean level of the clean gas, so that the information can be fed back to control and adjust the angles of the flow-guiding plates 222, 223 and 224 or the flow rate of the filter granules.

In the embodiment, the feedback control unit 25 is electrically connected with the first detecting unit 24 and the second detecting unit 26, and can control the angles of the first flow-guiding plate 222, the second flow-guiding plate 223 and the third flow-guiding plate 224 and flow rate of filter granules according to the detecting results of the first detecting unit 24 and the second detecting unit 26. Moreover, the feedback control unit 25 can control the swing period and angle of the flow-guiding plates and flow rate of filter granules according to the detecting results. To be noted, the feedback control unit 25 can simultaneously or independently control the angles of the first flow-guiding plate 222, the second flow-guiding plate 223, the third flow-guiding plate 224, and flow rate of filter granules by manual or electrical method.

In addition, the present invention also discloses a gas guiding system of a moving granular bed. In this embodiment, the gas guiding system at least includes the first flow-guiding plate of the inlet unit of gas, the first detecting unit and the feedback control unit of the moving granular bed 2 according to the previously mentioned embodiment.

Figure 4:
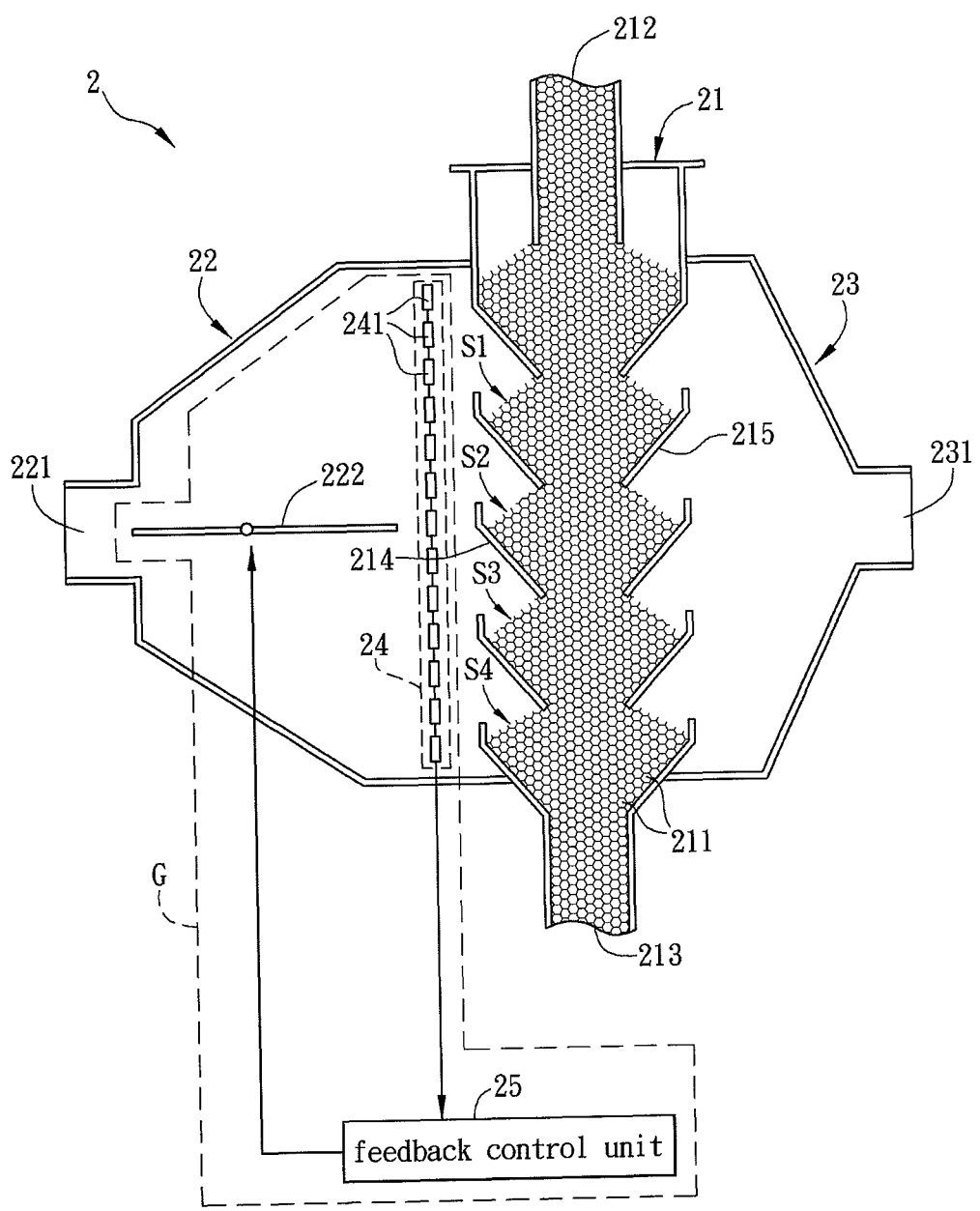
FIG. 4 is a cross-sectional view of a gas guiding system according to a preferred embodiment of the invention.

Referring to FIG. 4, the gas guiding system G is at least partially disposed between the filter granule channel 21 and a gas inlet 221. For example, the first flow-guiding plate 222 is disposed between the filter granule channel 21 and an inlet of gas 221, and the dirty gas enters the filter granule channel 21 through the inlet of gas 221. Besides, the elements of this embodiment having the same name and references as shown in the moving granular bed 2 of the previous embodiment have the same characteristics as those appeared in the above description, so the detailed illustrations thereof will be omitted.

The first detecting unit 24 is disposed between the first flow-guiding plate 222 and the filter granule channel 21 for detecting a gas velocity of the dirty gas. The feedback control unit 25 is electrically connected with the first detecting unit 24 and controls the angle of the first flow-guiding plate 222 according to a detecting result of the first detecting unit 24. Besides, the elements of this embodiment having the same name and references as shown in the moving granular bed 2 of the previous embodiment have the same characteristics as those appeared in the above description, so the detailed illustrations thereof will be omitted.

Figure 5:
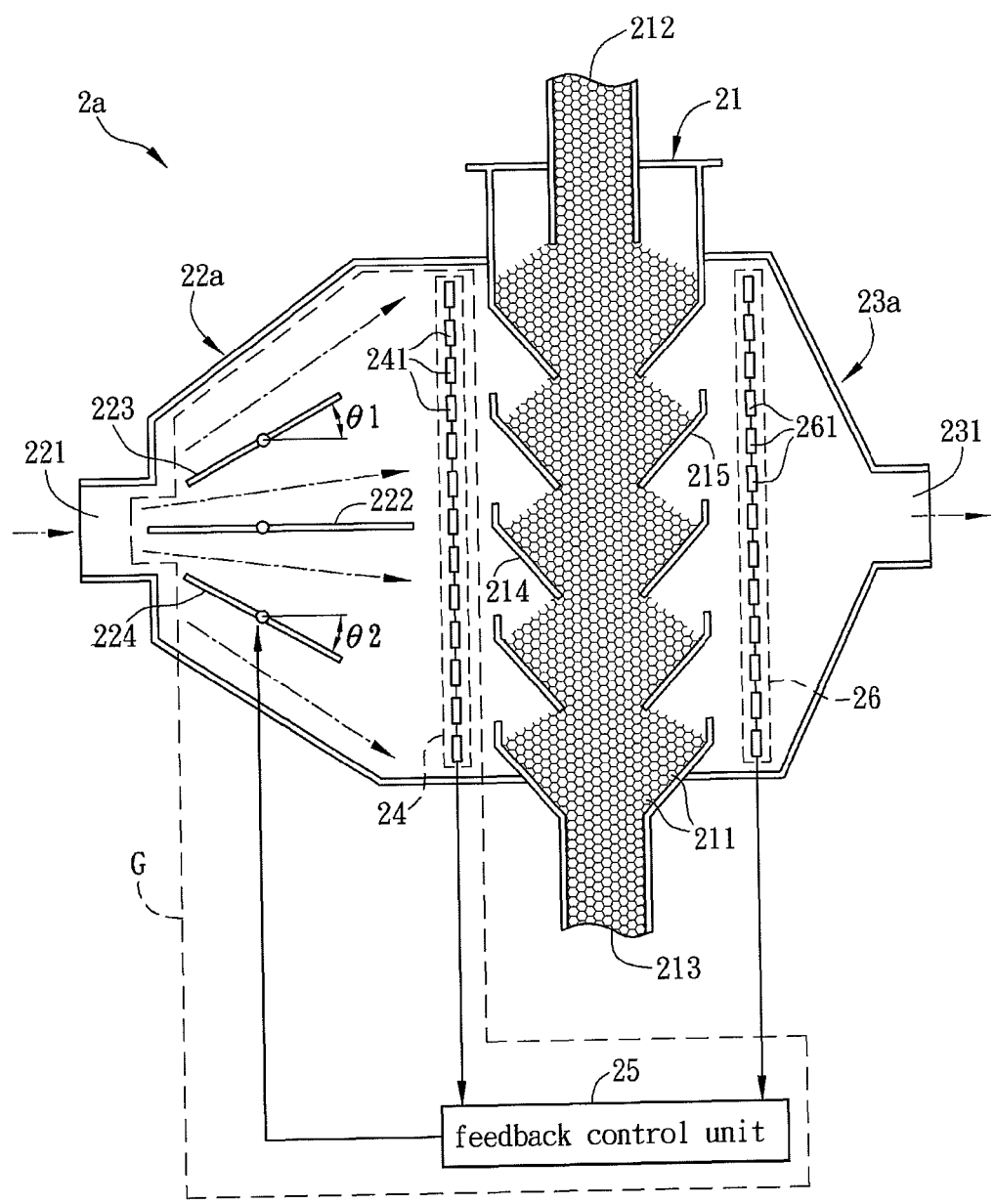
FIG. 5 is a cross-sectional view of another gas guiding system according to the embodiment of the invention.

As shown in FIG. 5, the gas guiding system G further includes a second flow-guiding plate 223 and a third flow-guiding plate 224. The first detecting unit 24 can be disposed between the second flow-guiding plate 223 and the filter granule channel 21, and between the third flow-guiding plate 224 and the filter granule channel 21. Besides, the elements of this embodiment having the same name and references as shown in the moving granular bed 2 of the previous embodiment have the same characteristics as those appeared in the above description, so the detailed illustrations thereof will be omitted.

In addition, the gas guiding system G may further include a second detecting unit 26, which is disposed between an outlet of gas 231 and the filter granule channel 21. Besides, the second detecting unit 26 of this embodiment has the same characteristics as that of the moving granular bed 2 in the previous embodiment, so the detailed illustrations thereof will be omitted.

In summary, the moving granular bed and the gas guiding system thereof of the invention are configured with at least one flow-guiding plate, the angle of which is adjustable. Thus, the airflow volume and gas velocity distribution of the dirty gas while entering the inlet of gas into the filter granule channel can be adjusted to improve the usage of the filter granules. In addition, the first detecting unit can detect the airflow volume and gas velocity at the inlet of gas, so that the airflow volume and gas velocity distribution of the dirty gas can be retrieved in real time. This configuration can determine that whether the dirty gas enters the filter granule channel as the desired conditions. In the invention, the feedback control unit is connected with the first detecting unit and the flow-guiding plate, so that it can control the angle of the flow-guiding plate and flow rate of filter granules according to the detecting result of the first detecting unit, thereby exactly controlling the airflow volume and gas velocity distribution of the dirty gas while entering the inlet of gas into the filter granule channel. This can further maintain the efficiency and stability while filtering the dirty gas.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A moving granular bed, comprising:
   a filter granule channel, wherein filter granules are filled in the filter granule channel;
   an inlet unit of gas disposed at one side of the filter granule channel and having a first flow-guiding plate, wherein dirty gas is fed into the filter granule channel through the inlet unit of gas;
   an outlet unit of gas disposed at the other side of the filter granule channel;
   a first detecting unit detecting a gas velocity and a dust concentration of the dirty gas at the inlet unit of gas; and
   a feedback control unit electrically connected with the first detecting unit and controlling the angle of the first flow-guiding plate relative to the direction of the air flow and flow rate of filter granules according to a detecting result of the first detecting unit.

2. The moving granular bed according to claim 1, wherein the angle of the first flow-guiding plate is between 0° and 50°.

3. The moving granular bed according to claim 1, wherein the length of the first flow-guiding plate is between 0.2 and 0.7 times of a geometric length of the inlet unit of gas.

4. The moving granular bed according to claim 1, wherein the configured number of the flow-guiding plates is about 0.002 to 0.01 times of the maximum height of the inlet unit of gas.

5. The moving granular bed according to claim 1, further comprising:
   filter granules filled in the filter granule channel.

6. The moving granular bed according to claim 1, further comprising:
   a second detecting unit detecting a gas velocity at the outlet unit of gas.

7. The moving granular bed according to claim 6, wherein the feedback control unit controls the angle of the first flow-guiding plate and flow rate of filter granules according to the detecting results of the first detecting unit and the second detecting unit.

8. A gas guiding system of a moving granular bed, wherein the gas guiding system is at least partially disposed between a filter granule channel and a gas inlet, and dirty gas is fed into the filter granule channel through the inlet of gas, and filter granules are filled in the filter granule channel, the gas guiding system comprising:
   a first flow-guiding plate disposed between the filter granule channel and the inlet of gas;
   a first detecting unit detecting a gas velocity and a dust concentration of the dirty gas; and
   a feedback control unit electrically connected with the first detecting unit and controlling the angle of the first flow-guiding plate relative to the direction of the air flow and flow rate of filter granules according to a detecting result of the first detecting unit.

9. The gas guiding system according to claim 8, wherein the angle of the first flow-guiding plate is between 0° and 50°.

10. The gas guiding system according to claim 8, wherein the first detecting unit is disposed between the first flow-guiding plate and the filter granule channel.

11. The gas guiding system according to claim 8, further comprising:
    a second detecting unit disposed between a gas outlet and the filter granule channel.

12. The gas guiding system according to claim 11, wherein the feedback control unit controls the angle of the first flow-guiding plate and flow rate of filter granules according to the detecting results of the first detecting unit and the second detecting unit.

* * * * *